United States Patent
Kojima et al.

[11] Patent Number: 6,092,874
[45] Date of Patent: Jul. 25, 2000

[54] SEAT RECLINING APPARATUS

[75] Inventors: Yasuhiro Kojima, Kariya; Yukifumi Yamada, Toyota; Tadasu Yoshida, Kariya, all of Japan

[73] Assignee: Aisin Seiki Kabushiki Kaisha, Kariya, Japan

[21] Appl. No.: 09/201,770

[22] Filed: Dec. 1, 1998

[51] Int. Cl.[7] .................................................. B60N 2/10
[52] U.S. Cl. ............................................ 297/367; 297/366
[58] Field of Search ................................. 297/353, 366, 297/367, 369

[56] References Cited

U.S. PATENT DOCUMENTS

| | | | |
|---|---|---|---|
| 4,076,309 | 2/1978 | Ckekirda et al. | 297/367 X |
| 4,082,352 | 4/1978 | Bales et al. | 297/367 X |
| 4,103,970 | 8/1978 | Homier | 297/367 X |
| 4,348,050 | 9/1982 | Letournoux et al. | 297/367 X |
| 4,659,146 | 4/1987 | Janiaud | 297/367 |
| 4,770,464 | 9/1988 | Pipon et al. | 297/367 |
| 5,161,856 | 11/1992 | Nishino | 297/367 |
| 5,216,936 | 6/1993 | Baloche | 297/367 X |
| 5,590,931 | 1/1997 | Fourrey et al. | 297/366 |
| 5,632,525 | 5/1997 | Uramichi | 297/367 |
| 5,664,837 | 9/1997 | Takagi | 297/367 |
| 5,681,086 | 10/1997 | Baloche | 297/367 |
| 5,692,589 | 12/1997 | Beguin | 297/367 X |

FOREIGN PATENT DOCUMENTS

| | | |
|---|---|---|
| 2 547 778 | 12/1984 | France . |
| 1-104201 | 4/1989 | Japan . |
| 2-128707 | 5/1990 | Japan . |

*Primary Examiner*—Peter M. Cuomo
*Assistant Examiner*—Rodney B. White
*Attorney, Agent, or Firm*—Burns, Doane, Swecker & Mathis, LLP

[57] ABSTRACT

A supporting structure between an upper arm and a lower arm is provided in a simple and compact manner. There comprises a recess portion formed in one of the lower arm and the upper arm in a partial pressing manner and provided with a bearing portion and an internal tooth portion constituting a ratchet in an inner peripheral surface, and a convex portion formed in the other of the lower arm and the upper arm in a partial pressing manner, arranged within the recess portion so that an outer peripheral surface is slidably brought into contact with a bearing portion and forming a guide groove slidably supporting the ball.

7 Claims, 5 Drawing Sheets

SEAT RECLINING APPARATUS

BACKGROUND OF THE INVENTION

The present invention relates to a seat reclining apparatus for vehicles for freely adjusting an inclination angle of a seat back with respect to a seat cushion.

Conventionally, as this kind of seat reclining apparatus, for example, there has been known a structure shown in the Japanese Patent Laid-open Publication Nos. 1-104201 (1989) or 2-128707 (1990). These are structured such as to have a lower arm adapted to be held to a seat cushion frame, an upper arm rotatably supported to the lower arm and adapted to be held to a seat back frame, and a lock mechanism having pawls which are arranged between the lower arm and the upper arm and a ratchet engaged with the pawls so as to restrict a rotation of the upper arm with respect to the lower arm.

In the former conventional apparatus, a first recess or depressed portion in which an internal tooth portion constituting a ratchet is formed on an inner peripheral surface of the recess is formed in the upper arm in a partial pressing manner, and guide grooves slidably supporting the pawls are formed in the lower arm in a partial pressing manner. Further, a second recess or depressed portion having contact portions on the outer peripheral surface thereof is formed in the lower arm in a partial pressing manner, and the contact portions of the second recess and the inner peripheral surface of the first recess are slidably brought into contact with each other, thereby rotatably supporting the upper arm with respect to the lower arm. Still further, a supporting plate extending in such a manner as to cover the outer peripheral edge of the lower arm and holding the lower arm therebetween is fixed to the upper arm, and the supporting plate prevents the upper arm and the lower arm from coming off in an axial direction.

In the latter conventional apparatus, a ring-shaped first metal fitting having an inner peripheral surface on which an internal tooth portion constituting a ratchet and a bearing portion are formed is fixed to the upper arm, a second metal fitting in which a guide groove slidably supporting the pawl is formed and having an outer peripheral surface slidably brought into contact with the bearing portion of the first metal fitting is fixed to the lower arm, and the upper arm is rotatably supported to the lower arm by a slidable contact between the bearing portion of the first metal fitting and the outer peripheral surface of the second metal fitting. Further, the upper arm is held between the lower arm and the second metal fitting, thereby preventing the upper arm and the lower arm from coming off in an axial direction.

However, in the former conventional apparatus mentioned above, since the contact portion of the lower arm is slidably brought into contact with the inner peripheral edge of the recess so as to support the upper arm to the lower arm, it is necessary to make the lower arm larger than the upper arm, so that the total size of the apparatus is increased at that degree, and a cost and a weight are increased.

Further, in the latter conventional apparatus, since the first metal fitting and the second metal fitting are required, a number of the parts is increased, so that a cost and a weight are increased at that degree. Still further, since the upper arm is held between the second metal fitting and the lower arm, it is necessary to provide an opening having a large area in the upper arm, so that a strength of the upper arm is reduced at that degree.

SUMMARY OF THE INVENTION

Accordingly, a main object of the present invention is to provide a supporting structure for supporting an upper arm to a lower arm which is simple and compact.

In order to achieve the object mentioned above, in accordance with the present invention, there is provided technical means which is structured such as to have a recess portion formed in one of the lower arm and the upper arm in a partial pressing manner and provided with a bearing portion and an internal tooth portion constituting the ratchet in an inner peripheral surface, and a convex portion formed in the other of the lower arm and the upper arm in a partial pressing, arranged within the recess portion so that an outer peripheral surface of the convex portion is slidably brought into contact with the bearing portion and forming a guide groove slidably supporting a pawl which is engageable with the internal tooth portion.

In accordance with this technical means, the upper arm is supported to the lower arm due to a slidable contact between the bearing portion of the depressed recess portion and the outer peripheral surface of the depressed convex portion. Accordingly, the upper arm and the lower arm can be made compact, and the metal fittings required in the conventional arts are not required, so that a number of the parts can be reduced.

More preferably, the wall constituting the recess portion constitutes a mounting surface to the frame member in a side of the seat back.

More preferably, the structure may further comprises a support plate arranged between the mounting surface of the upper arm and the frame member, extending in such a manner as to cover the outer peripheral edge of the upper arm so as to engage with the outer peripheral edge of the lower arm and holding the upper arm between the support plate and the lower arm.

DESCRIPTION OF THE PREFERRED EMBODIMENT

Figure 1:
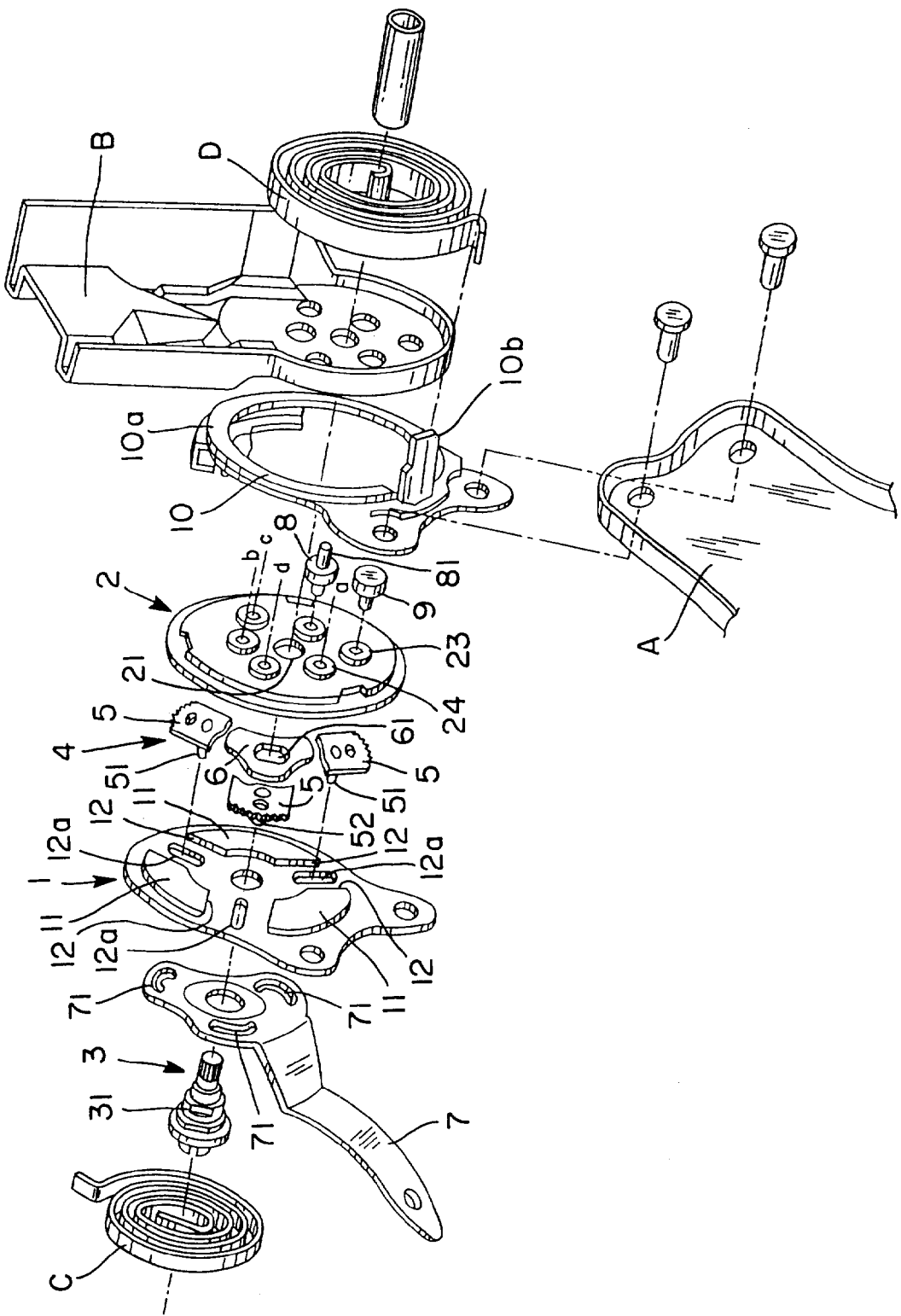
FIG. 1 is an exploded perspective view of a seat reclining apparatus in accordance with the invention.
Figure 2:
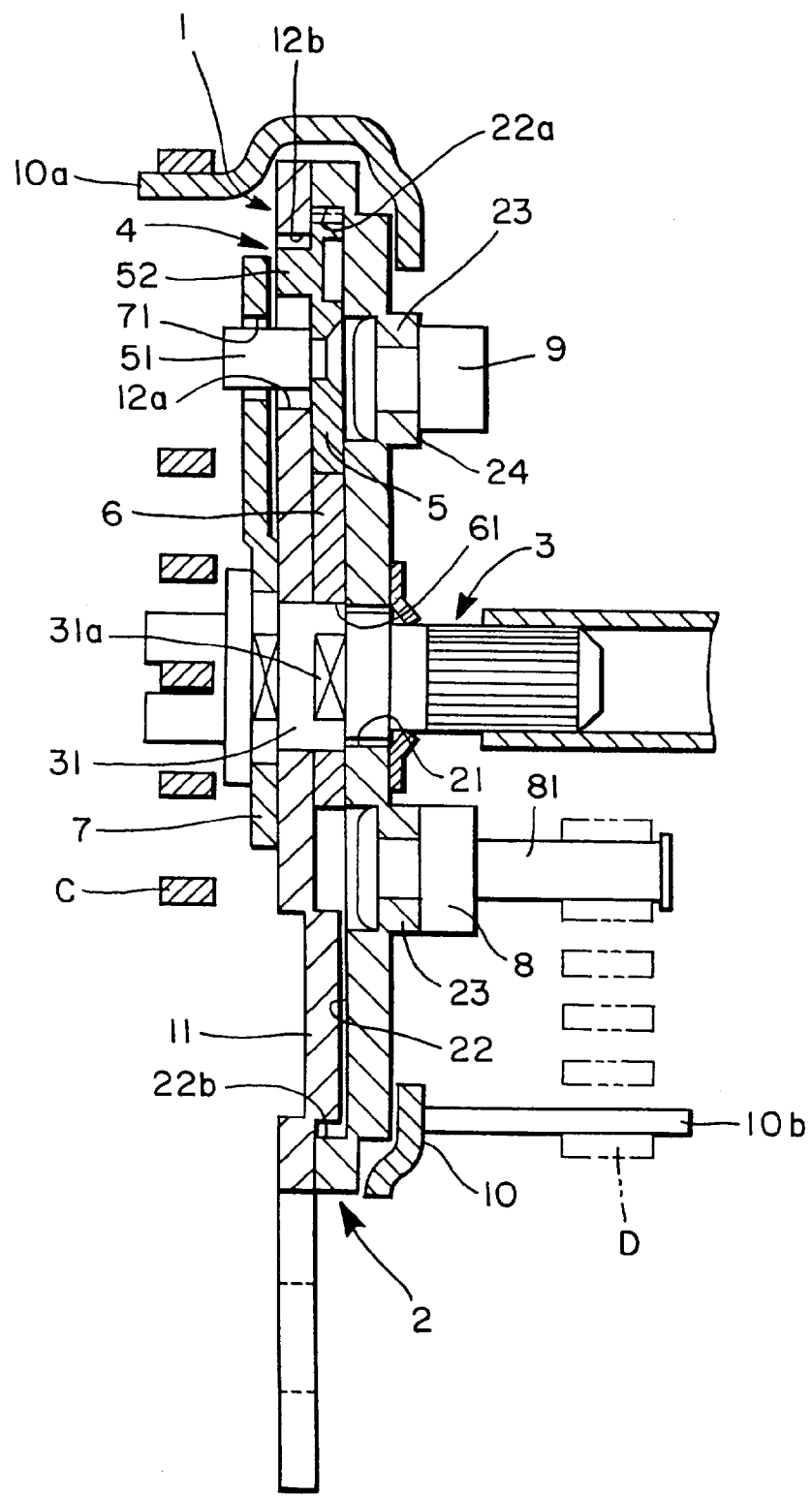
FIG. 2 is a vertical cross sectional view of the seat reclining apparatus in accordance with the invention.

As shown in FIGS. 1 and 2, an upper arm 2 fixed to a seat back frame B of a seat assembly of an automobile is rotatably supported to a lower arm 1 fixed to a seat cushion frame A of the seat assembly. A rotation shaft 3 arranged on a center axis of a rotation of the upper arm 2 with respect to the lower arm 1 is rotatably supported to the lower arm 1. The rotation shaft 3 extends through a through hole 21 formed in the upper arm 2. In this case, the through hole 21 has a diameter larger than a diameter of the rotation shaft 3, and a slight gap is formed between the upper arm 2 and the rotation shaft 3. A lock mechanism 4 is positioned in the periphery of the rotation shaft 3 and arranged in a space between the lower arm 1 and the upper arm 2. A pipe fixed on the rotation shaft 3 extends toward the other side of the seat assembly to transmit a rotation torque applied to the rotation shaft 3 to a seat reclining mechanism arranged on the other side of the seat assembly.

The lock mechanism 4 is constituted by three pawls 5, which are circumferentially equally spaced and internal tooth portions 22a engaged with external tooth portions of each pawls 5 and disengaged therewith.

Figure 3:
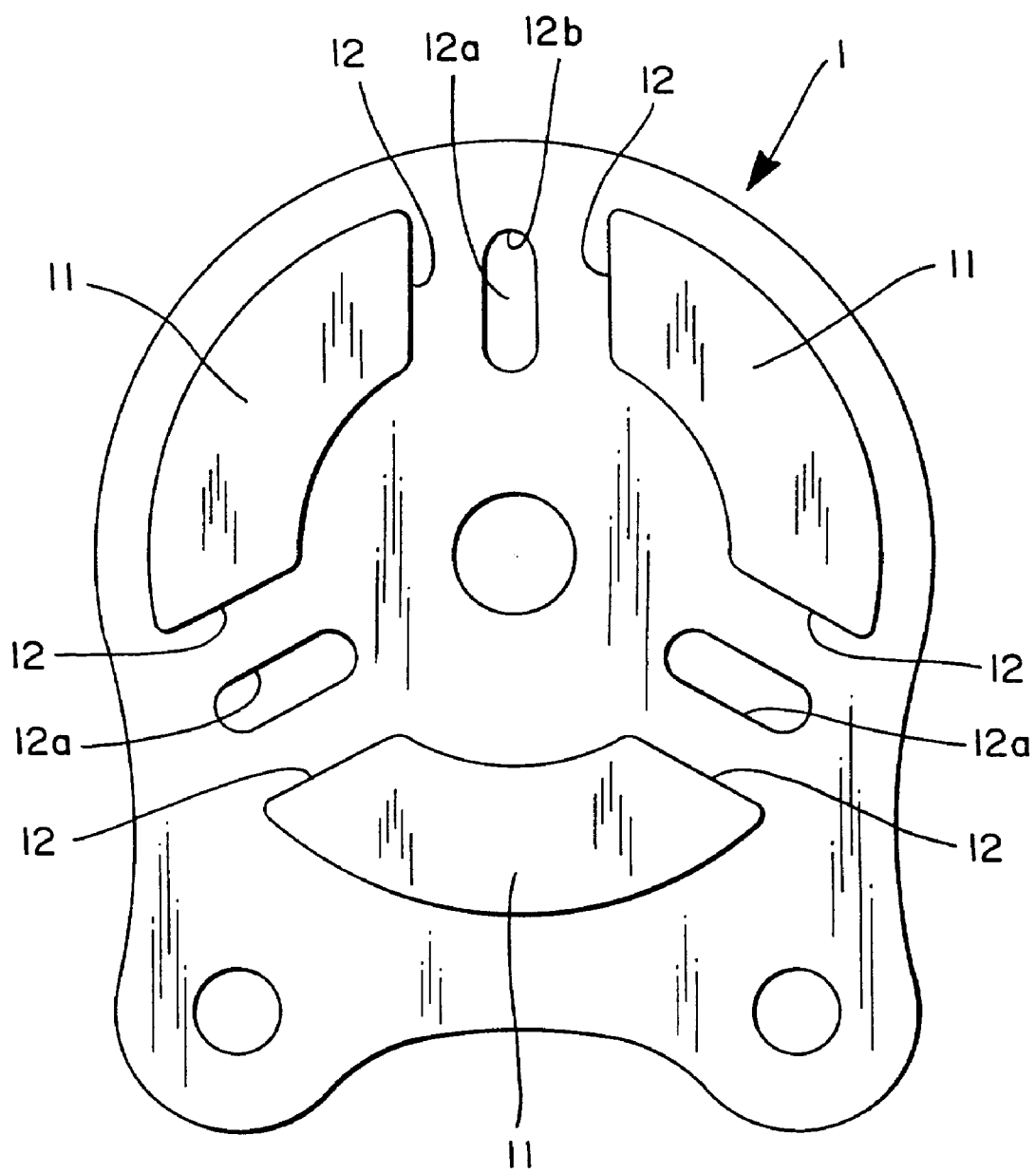
FIG. 3 is a plan view of a lower arm of the seat reclining apparatus in accordance with the invention.
Figure 5:
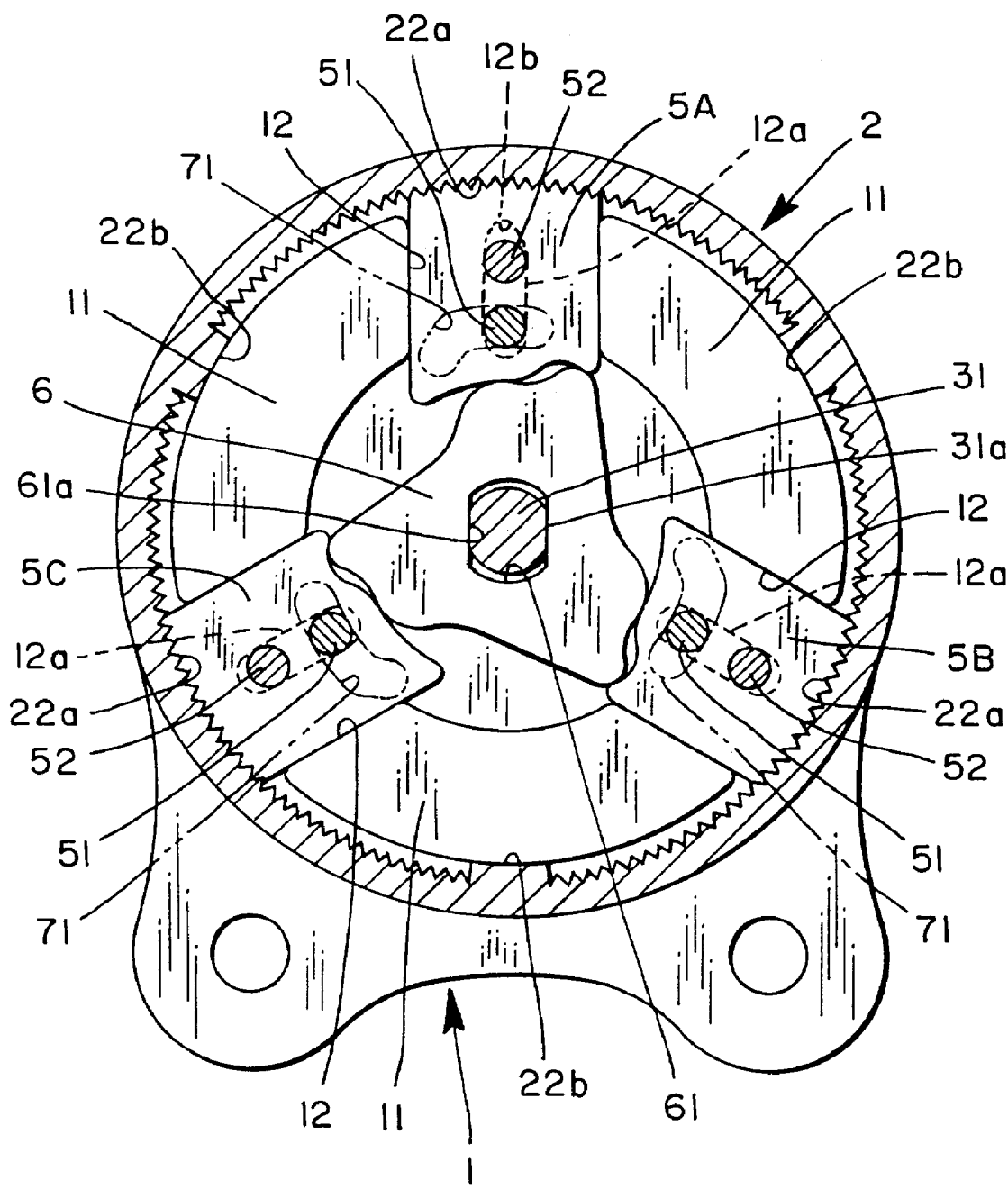
FIG. 5 is a plan view which shows a lock mechanism of the seat reclining apparatus in accordance with the invention.

As shown in FIGS. 3 and 5, three convex portions 11 are formed on the lower arm 1 in a partial pressing manner so as to be projected toward the upper arm 2. Each of the convex portions 11 is formed in a fan shape extending in a circumferential direction around the rotation shaft 3, and is positioned on the same circumference so that an end surface of each convex portion 11 in the peripheral direction opposes to a peripheral end surface of the adjacent convex portion 11 in a spaced relation. Accordingly, three guide grooves 12 (in a radial direction of the rotation shaft 3) radially extending between the opposing peripheral end surfaces of the convex portions 11 are formed on the lower arm 1. Each guide grooves 12 are arranged substantially at a uniform interval in a peripheral direction around the rotation shaft 3. Each of the pawls 5 is arranged within each guide groove 12 and supported to the lower arm 1 in such a manner as to freely slide along the guide groove 12 in a radial direction.

Figure 4:
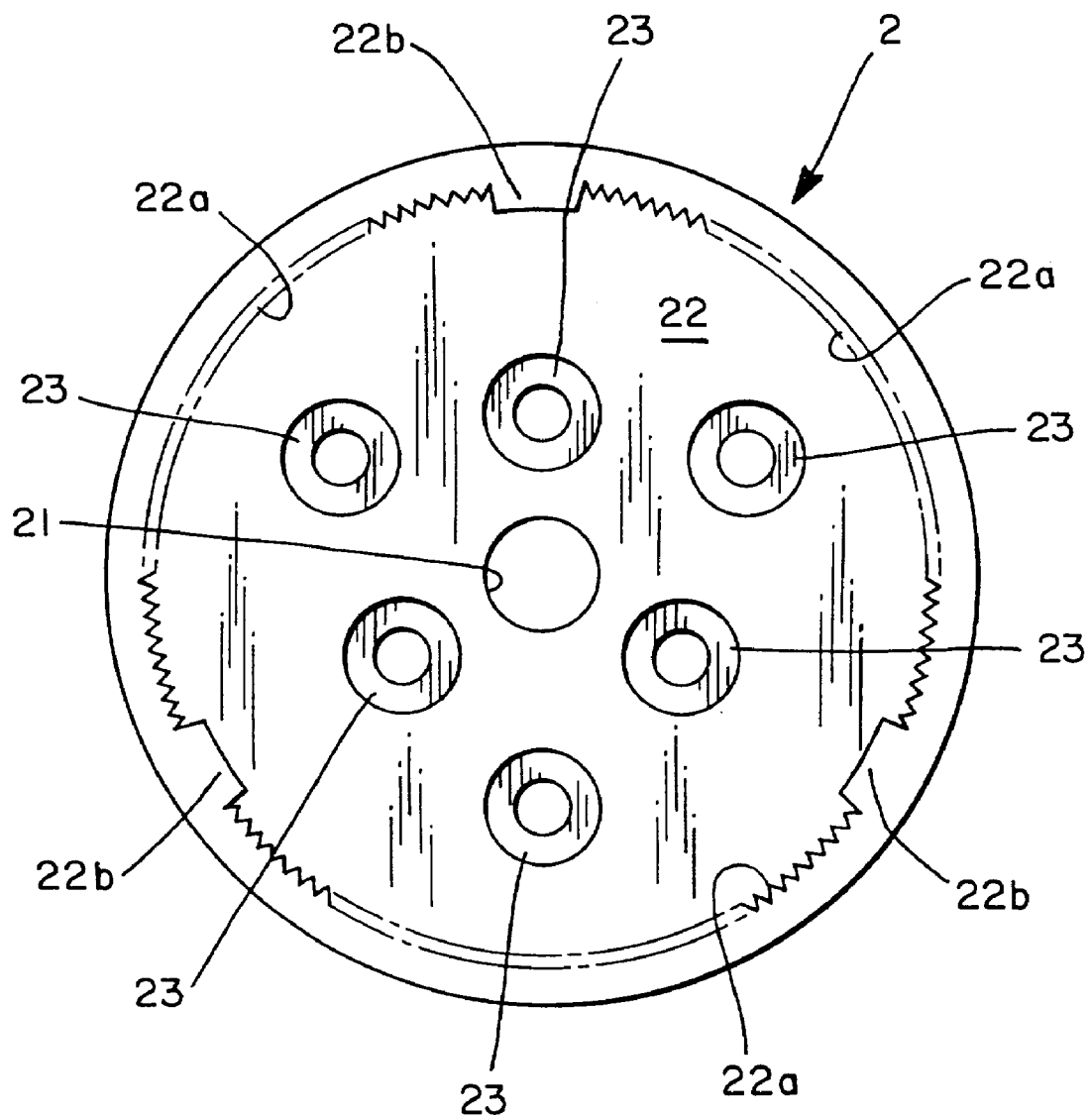
FIG. 4 is a plan view of an upper arm of the seat reclining apparatus in accordance with the invention.

As shown in FIGS. 4 and 5, a recess portion 22 in a substantially regular circular shape is formed on a surface of the upper arm 2 in a side opposite to the lower arm 1 in a partial pressing manner and around the rotation shaft 3. Internal tooth portions 22a engageable with the external tooth portions of the pawls 5 mentioned above and bearing portions 22b between the internal tooth portions 22a are integrally formed on the inner peripheral surface of the recess portion 22 by forming the recess portion 22.

In the structure mentioned above, as shown in FIG. 5, the convex portions 11 of the lower arm 1 are received within the recess portion 22 of the upper arm 2, and an outer peripheral surface of each convex portion 11 is slidably brought into contact with each bearing portion 22b. Accordingly, the upper arm 2 is rotatably supported to the lower arm 1. Further, the pawls 5 are opposed to the internal tooth portions 22a, and are arranged so as to engage with or disengage from the internal tooth portions 22a in accordance with a sliding operation of the pawls 5.

A support portion 31 having opposed flat surfaces 31a is formed on the rotation shaft 3, and a cam member 6 is supported to the supporting portion 31 so as to integrally rotate. The cam member 6 is arranged within the recess portion 22 so as to be brought into contact with inner surfaces of the three pawls 5, and press the pawls 5 in a direction of engaging with the internal tooth portion 22a by being brought into contact with the inner surfaces of the pawls 5. Further, a through hole 61 to which the rotation shaft 3 is inserted has a diameter slightly lager than a diameter of the supporting portion 31, and is provided with opposed flat surfaces 61a slidably brought into contact with the opposed flat surfaces 31a. The opposed flat surfaces 31a and 61a extend in a vertical direction in FIG. 5 so as to move toward a cam surface 12b mentioned below, and the cam member 6 is structured such as to integrally rotate together with the rotation shaft 3 and move with respect to the rotation shaft 3 by the opposed flat surfaces 31a and 61a.

An operation handle 7 is secured to the rotation shaft 3 in such a manner as to integrally rotate. Elongated holes 12a extending in a guide direction are formed in each guide groove 12 of the lower arm 1, and pins 51 passing through the holes 12a and extending toward the side of the operation handle 7 are extended from the pawl 5, respectively. Cam slots 71 are formed in the operation handle 7, which are circumferentially equally spaced, and the pins 51 of each pawls 5 are inserted into the cam slots 71, respectively. Accordingly, each pawl 5 can be slid along each guide groove 12 due to a cam operation between the pins 51 and the cam slots 71 so as to cancel an engagement between the pawl and the internal tooth portion 22a.

As shown in FIGS. 3 and 5, the cam surface 12b having an end gradually tapered is formed in one (disposed in an upper side in FIG. 5) of the elongated holes 12a. A protrusion 52 being in parallel to the pin 51 and inserted into the elongated hole 12a is formed in the pawl 5 in a partial pressing manner. The protrusion 52 (the protrusion 52 of the pawl SA in an upper side in FIG. 5) inserted into the elongated hole 12a in which the cam surface 12b is formed can be brought into contact with the cam surface 12b, whereby the cam 6 member is moved with respect to the rotation shaft 3.

A plurality of boss portions 23 are formed in a wall constituting the recess portion 22 of the upper arm 2, which are circumferentially equally spaced. The upper arm 2 is mounted to the seat back frame B by two kinds of pins 8 and 9 inserted into the boss portions 23, and the front end surfaces of the boss portions 23 constitute mounting surfaces 24. In this case, the pin 8 is also mounted to portion a in FIG. 1, the pins 9 are mounted to portions b, c and d in FIG. 1, and the pin 8 is provided with a shaft portion 81 longer than that of the pin 9. The shaft portion 81 receives one end of a spring D.

A supporting plate 10 is arranged in a side of the mounting surface 24 of the upper arm 2. The supporting plate 10 is formed in a ring shape, and is commonly fastened together with the lower arm 1 and fixed to the seat cushion frame. A flange portion 10a covering a part of an outer peripheral edge of the upper arm 2 and extending to a side of the lower arm 1 is formed in the supporting plate 10. The flange portion 10a engages with the outer peripheral edge of the lower arm 1, whereby the upper arm 2 is held between the lower arm 1 and the supporting plate 10 so as to prevent the upper arm 2 from being removed from the lower arm 1 in an axial direction. The other end of the spring D is engaged with a projection 10b of the supporting plate 10.

In this case, a spring C arranged in a periphery of the rotation shaft 3 is provided between the supporting plate 10 and the rotation shaft 3 in a tensional manner, and rotates and urges the rotation shaft 3 so that the pawls 5 are pressed radially outwardly by the cam member 6 so as to be engaged with the internal tooth portion 22a. Further, the spring D as mentioned above is provided between the supporting plate 10 and the upper arm 2 in a tensional manner, and rotates and urges the upper arm 2 with respect to the lower arm 1.

Next, an operation will be described below.

All the pawls 5 are normally pressed by a contact between the cam member 6 and the radial inner surfaces of the pawls 5, whereby all the pawls 5 and the internal tooth portions 22a are engaged with each other so as to prevent the upper arm 2 from rotating with respect to the lower arm 1.

In this state, when the handle 7 is operated so as to rotate the rotation shaft 3 against the urging force of the spring C, the cam member 6 also rotates in a clockwise direction in FIG. 5 in an integral manner with the rotation shaft 3 and the all the pawls 5 are slid along the guide grooves 12 due to a cam effect between the cam slots 71 of the operating handle 7 and the pins 51 of the pawls 5. Accordingly, the engagement between all the pawls 5 and the internal tooth portions 22a is cancelled, the upper arm 2 receives the urging force of the spring D and is rotated with respect to the lower arm 1 due to a slidable contact between the bearing portions 22b and the convex portions 11.

When canceling the operation of the operation handle 7, the rotation shaft 3 receives the urging force of the spring C and rotates in an inverse direction to that mentioned above. Accordingly, all the pawls 5 are slid along the guide grooves 12 in an inverse direction due to the cam effect between the cam slots 71 of the operation handle 7 and the pins 51 of the pawls 5, and the cam member 6 rotates in an inverse direction so as to be brought into contact with the inner surfaces of the pawls 5, thereby pressing all the pawls 5. As a result, all the pawls 5 and the internal tooth portions 22a are again engaged with each other, so that the rotation between the upper arm 2 and the lower arm 1 is restricted.

At this time, the protrusion 52 of the pawl 5A is brought into contact with the cam surface 12b of the elongated hole 12 in the lower arm 1. Accordingly, the pawl 5A presses the cam member 6 due to the reaction force thereof, and move in a lower direction in FIG. 5 with respect to the rotation shaft 3. Accordingly, the back surfaces of the remaining pawls 5 (two pawls 5B and 5C in a lower side in FIG. 5) in which the cam surface 12b and the protrusion 52 are not brought into contact with each other are pressed, so that the pawls 5B and 5C are pressed in a direction of engaging with the internal tooth portion 22a in a stronger manner. As a result, the pawls 5B and 5C engage with the internal tooth portions 22a in a deeper manner, and press down the upper arm 2 through the engagement downwardly in FIG. 5, so that the pawl 5A and the internal tooth portion 22a are engaged with each other in a deeper manner. Accordingly, a play between the upper arm 2 and the lower arm 1 in a rotational direction can be securely restricted.

Further, in a state that the rotation between the upper arm 2 and the lower arm 1 is restricted by the engagement between the pawls 5 and the internal tooth portions 22a, when the load acts on the upper arm 2 from the seat back frame B, the load is received by a slidable contact between the bearing portions 22b and the outer peripheral surfaces of the convex portions 11 so as to be transmitted to the lower arm 1. Accordingly, the load does not act on the rotation shaft 3, so that a smooth rotation of the rotation shaft 3 can be secured.

In accordance with the invention, since the structure is made such that the cam surface brought into contact with one of the pawls is formed in the lower arm, and the other pawls are pressed through the cam member in an engaging direction of the ratchet, all the pawls and the ratchet can be more firmly engaged with each other in comparison with the related art, and a play between the pawls and the ratchet can be restricted in comparison with the related art.

As many apparently widely different embodiments of the present invention can be made without departing from the spirit and scope thereof, it is to be understood that the invention is not limited to the specific embodiments thereof except as defined in the appended claims.

What is claimed is:

1. A seat reclining apparatus for vehicles comprising:

a lower arm adapted to be held to a seat cushion frame;

an upper arm rotatably supported to said lower arm and held to a seat back frame; and a lock mechanism comprising a ratchet and pawls which are arranged between said lower arm and said upper arm, said ratchet and said pawls being adapted to engage each other to restrict rotation of said upper arm with respect to said lower arm, one of said lower arm and said upper arm being provided with a recess portion formed in a partial pressing manner, said recess portion having an inner peripheral surface provided with bearing portions and tooth portions which form said ratchet, and raised portions formed in the other of said lower arm and said upper arm in a partial pressing manner and arranged within said recess portion so that outer peripheral surfaces of said raised portions are slidably brought into contact with said bearing portions, and including guide grooves defined between adjacent raised portions and slidably supporting the pawls.

2. A seat reclining apparatus according to claim 1, wherein said recess portion is formed in a wall of the upper arm that serves as a mounting surface that is mounted to the seat back frame.

3. A seat reclining apparatus according to claim 2, further comprising a support plate arranged between said mounting surface of said upper arm and said seat back frame, said upper arm having an outer peripheral edge, said support plate having a flange portion covering less than an entirety of an outer peripheral edge of said upper arm and engaging an outer peripheral edge of said lower arm so that said upper arm is held between the support plate and said lower arm.

4. A seat reclining apparatus for vehicles comprising:

a lower arm adapted to be secured on a seat cushion frame;

an upper arm adapted to be secured on a seat back frame and rotatably supported on the lower arm; and lock means for restricting an angle of inclination of the upper arm with respect to the lower arm, said lock means being disposed between opposed surfaces of the lower arm and the upper arm;

a circularly depressed recess formed on one of the arms, said lock means including at least one internal tooth portion provided on an inner peripheral surface of the depressed recess, and at least one pawl disposed in the depressed recess and slidable in a radial direction at least one bearing portion provided on the inner peripheral surface of the depressed recess, and raised portions formed on the other arm and housed in the depressed recess in such a manner that outer peripheral surfaces of the raised portions are brought into contact with the bearing portion while an external tooth portion of the pawl is engageable with the internal tooth portion, and the raised portions defining a guide groove in which the pawl is slidably positioned.

5. A seat reclining apparatus according to claim 4, further comprising a supporting plate adapted to be secured to the seat cushion frame and engaged with an outer periphery of the lower arm while also covering less than an entirety of an outer periphery of the upper arm.

6. A seat reclining apparatus for vehicles comprising:

a lower arm adapted to be secured to a seat cushion frame and having evenly spaced raised portions between which guide grooves are defined, said lower arm being provided with elongated holes;

an upper arm adapted to be secured to a seat back frame and having a depressed circular portion on which internal gear portions and bearing portions are formed and in which the raised portions of the lower arm are housed;

a plurality of pawls each disposed in one of the guide grooves in a radially slidable manner and each having an external gear portion engageable with one of the internal gear portions;

a rotation shaft rotatably supported on the lower arm and having opposed flat surfaces;

a cam member having a through hole with opposed flat surfaces and secured to the rotation shaft through the opposed flat surfaces; and a handle secured to the rotation shaft to rotate the cam member, said handle being provided with cam slots;

the pawls each having a pin which axially extends through one of the elongated holes formed on the lower arm and one of the cam slots formed on the handle, each pawl being radially moved by rotational movement of the cam member.

7. A seat reclining apparatus according to claim 6, further comprising a support plate adapted to be secured to the seat cushion frame and having means for maintaining a distance relation between the lower arm and the upper arm.

* * * * *

UNITED STATES PATENT AND TRADEMARK OFFICE
CERTIFICATE OF CORRECTION

PATENT NO. : 6,092,874
DATED : July 25, 2000
INVENTOR(S) : Yasuhiro Kojima, et al.

It is certified that error appears in the above-identified patent and that said Letters Patent is hereby corrected as shown below:

The following information is added:
Item [30]     Foreign Application Priority Data
Dec. 2, 1997  [JP]     Japan...........................9-332083

Signed and Sealed this

Ninth Day of October, 2001

*Attest:*

NICHOLAS P. GODICI
*Attesting Officer*     *Acting Director of the United States Patent and Trademark Office*